United States Patent
Zhao et al.

(10) Patent No.: US 10,380,771 B2
(45) Date of Patent: Aug. 13, 2019

(54) DATA INSIGHTS FOR VISUALIZATIONS BASED ON DIMENSIONS

(71) Applicant: SAP SE, Walldorf (DE)

(72) Inventors: Guanjie Zhao, Vancouver (CA); Shariq Aziz, Vancouver (CA); Flavia Moser, Vancouver (CA); Steve Norton, Vancouver (CA); Saeed Jahankhani, Vancouver (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/724,857

(22) Filed: Oct. 4, 2017

(65) Prior Publication Data

US 2018/0336710 A1 Nov. 22, 2018

Related U.S. Application Data

(60) Provisional application No. 62/506,997, filed on May 16, 2017.

(51) Int. Cl.

| | |
|---|---|
| *G06T 11/20* | (2006.01) |
| *G06F 17/15* | (2006.01) |
| *G06F 17/17* | (2006.01) |
| *G06F 16/22* | (2019.01) |
| *G06F 16/28* | (2019.01) |
| *G06K 9/62* | (2006.01) |

(52) U.S. Cl.
CPC ........ *G06T 11/206* (2013.01); *G06F 16/2264* (2019.01); *G06F 16/283* (2019.01); *G06F 17/153* (2013.01); *G06F 17/175* (2013.01); *G06K 9/6232* (2013.01)

(58) Field of Classification Search
CPC .................................................... G06T 11/206
See application file for complete search history.

(56) References Cited

U.S. PATENT DOCUMENTS

| | | | |
|---|---|---|---|
| 9,953,372 B1* | 4/2018 | Dziabiak | G06Q 30/02 |
| 2006/0010113 A1* | 1/2006 | Berger | G06F 17/30418 |
| 2008/0162209 A1* | 7/2008 | Gu | G06Q 10/0637 |
| 2015/0254369 A1* | 9/2015 | Hou | G06F 3/0486 |
| | | | 707/798 |
| 2016/0055232 A1* | 2/2016 | Yang | G06F 16/2428 |
| | | | 707/740 |

(Continued)

*Primary Examiner* — Phi Hoang
(74) *Attorney, Agent, or Firm* — Fountainhead Law Group P.C.

(57) ABSTRACT

Some embodiments provide a program that receives from a client device a dimension value for a first dimension in a plurality of dimensions of a data model and a measure in a set of measures of the data model. The program further determines a cardinality of dimension values for each dimension in the plurality of dimensions. The program also selects a subset of dimensions in the plurality of dimensions based on the cardinalities of dimension values for the plurality of dimensions. The program further sends the subset of dimensions in the plurality of dimensions to the client device. The program also receives from the client device a request for a chart visualization comprising data values associated with the measure and categorized according to a second dimension in the subset of dimensions. In response to the request, the program further sends the chart visualization to the client device.

20 Claims, 10 Drawing Sheets

(56) References Cited

U.S. PATENT DOCUMENTS

| | | | |
|---|---|---|---|
| 2016/0162165 A1* | 6/2016 | Lingappa | G06T 11/206 715/771 |
| 2016/0188185 A1* | 6/2016 | Bous | G06T 11/206 715/202 |
| 2017/0193116 A1* | 7/2017 | Wong | G06F 3/0484 |
| 2017/0237799 A1* | 8/2017 | Veeravalli | H04L 43/08 709/224 |

* cited by examiner

DATA INSIGHTS FOR VISUALIZATIONS BASED ON DIMENSIONS

CROSS REFERENCE TO RELATED APPLICATION

The present application claims the benefit and priority of U.S. Provisional Application No. 62/506,997, filed May 16, 2017, entitled "Smart Business Intelligence," the entire contents of which are incorporated herein by reference in its entirety for all purposes.

BACKGROUND

Today, many computing systems and computing devices generate and store an increasing amount of data. The data may contain information that becomes meaningful once the data is processed. One way to provide meaning to the data is to process the data and present the data in visualizations. Examples of visualizations include histograms, pie charts, scatter plots, cartograms, choropleths, dot distribution maps, matrices, etc. Different visualizations may present different information. For instance, one visualization may present revenue sales data, another visualization may present population density data, yet another visualization may present store location data, etc.

SUMMARY

In some embodiments, a non-transitory machine-readable medium stores a program. The program receives from a client device a dimension value for a first dimension in a plurality of dimensions of a data model and a measure in a set of measures of the data model. The program further determines a cardinality of dimension values for each dimension in the plurality of dimensions. The program also selects a subset of dimensions in the plurality of dimensions based on the cardinalities of dimension values for the plurality of dimensions. The program further sends the subset of dimensions in the plurality of dimensions to the client device. The program also receives from the client device a request for a chart visualization comprising data values associated with the measure and categorized according to a second dimension in the subset of dimensions. In response to the request, the program further sends the chart visualization to the client device.

In some embodiments, the chart visualization may be a first chart visualization. The program may further provide a second chart visualization comprising a set of data values associated with the measure and categorized according to the dimension. The dimension value of the first dimension may be received through the second chart visualization. The program may also determine structural relationships between pairs of dimensions in the plurality of dimensions. Selecting the subset of dimensions in the plurality of dimensions may be further based on the structural relationships.

In some embodiments, the program may further generate the chart visualization in response to the request. Generating the chart visualization may include filtering the data values associated with the measure based on the dimension value for the first dimension. Generating the chart visualization may further include categorizing the filtered data values associated with the measure based on the second dimension.

In some embodiments, a method receives from a client device a dimension value for a first dimension in a plurality of dimensions of a data model and a measure in a set of measures of the data model. The method further determines a cardinality of dimension values for each dimension in the plurality of dimensions. The method also selects a subset of dimensions in the plurality of dimensions based on the cardinalities of dimension values for the plurality of dimensions. The method further sends the subset of dimensions in the plurality of dimensions to the client device. The method also receives from the client device a request for a chart visualization comprising data values associated with the measure and categorized according to a second dimension in the subset of dimensions. In response to the request, the method further sends the chart visualization to the client device.

In some embodiments, the chart visualization may be a first chart visualization. The method may further providing a second chart visualization comprising a set of data values associated with the measure and categorized according to the dimension. The dimension value of the first dimension may be received through the second chart visualization. The method may also determine structural relationships between pairs of dimensions in the plurality of dimensions. Selecting the subset of dimensions in the plurality of dimensions may be further based on the structural relationships.

In some embodiments, the method may further generate the chart visualization in response to the request. Generating the chart visualization may include filtering the data values associated with the measure based on the dimension value for the first dimension. Generating the chart visualization may further include categorizing the filtered data values associated with the measure based on the second dimension.

In some embodiments, a system includes a set of processing units and a non-transitory computer-readable medium that stores instructions. The instructions cause at least one processing unit to receive from a client device a dimension value for a first dimension in a plurality of dimensions of a data model and a measure in a set of measures of the data model. The instructions further cause the at least one processing unit to determine a cardinality of dimension values for each dimension in the plurality of dimensions. The instructions also cause the at least one processing unit to select a subset of dimensions in the plurality of dimensions based on the cardinalities of dimension values for the plurality of dimensions. The instructions further cause the at least one processing unit to send the subset of dimensions in the plurality of dimensions to the client device. The instructions also cause the at least one processing unit to receive from the client device a request for a chart visualization comprising data values associated with the measure and categorized according to a second dimension in the subset of dimensions. In response to the request, the instructions further cause the at least one processing unit to send the chart visualization to the client device.

In some embodiments, the chart visualization may be a first chart visualization. The instructions may further cause the at least one processing unit to provide a second chart visualization comprising a set of data values associated with the measure and categorized according to the dimension. The dimension value of the first dimension may be received through the second chart visualization. The instructions may also cause the at least one processing unit to determine structural relationships between pairs of dimensions in the plurality of dimensions. Selecting the subset of dimensions in the plurality of dimensions may be further based on the structural relationships.

In some embodiments, the instructions may further cause the at least one processing unit to generate the chart visualization in response to the request. Generating the chart visualization may include filtering the data values associated with the measure based on the dimension value for the first dimension.

The following detailed description and accompanying drawings provide a better understanding of the nature and advantages of the present invention.

DETAILED DESCRIPTION

Figure 1:
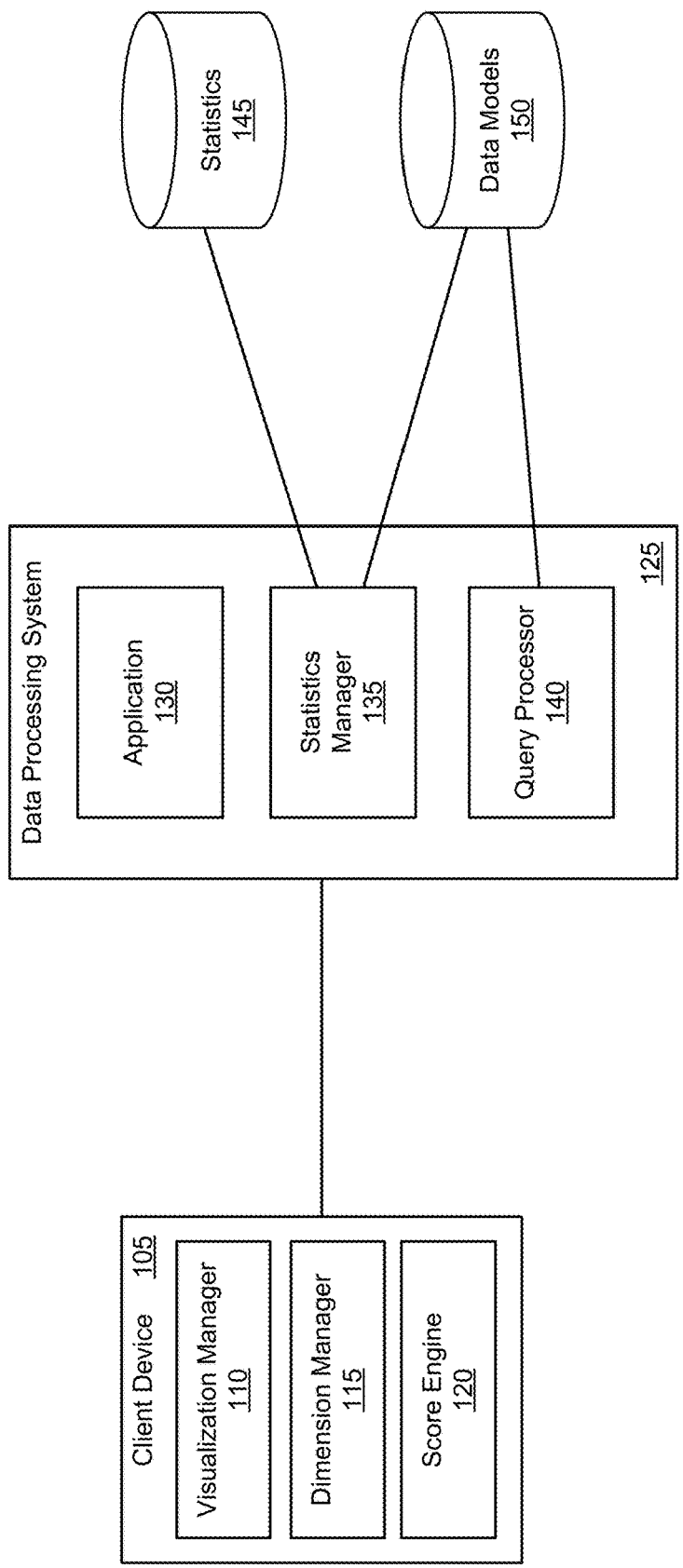
FIG. 1 illustrates a system for providing insights into visualizations of data according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing insights into visualization of data. In some embodiments, a system that provides a client device with visualizations of data stored according to a data model. The client device may send the system a dimension of the data model and request the system to determine a set of dimensions in the data model that can provide insights into the data. In some embodiments, the system uses several criteria to identify dimensions in the data model and eliminate them from being included in this set of dimensions. When the system provides the set of dimensions to the client device, the client device may request the system for metrics that the client device uses to rank the dimensions. Based on the ranked dimensions, the client device provides a subset of the ranked dimensions to a user of the client device for selection. Thus, by using the several criteria to eliminate dimensions from being included in the set of dimensions send to the client device, the system reduces the search space of dimensions from which the client device ranks dimensions. In addition, reducing the search space of dimensions improves the performance the system as there are less dimensions for the system to determine metrics for. Also, reducing the search space of dimensions improves the performance of the client device since there are less dimensions for the client device to rank. When the client device receives a selection of a dimension from the user, the client device can send the system a request for a visualization of the data categorized according to the selected dimension. The client device then presents the requested visualization to the user.

In some embodiments, a data model is defined as one or more views and one or more tables associated with the one or more views. A view can be a filter associated with one or more tables that provides access to one or more attributes (e.g., columns) of the one or more tables. Alternatively or in addition, a view may provide access to data calculated based on and/or derived from one or more attributes of the one or more tables. In some instances, a view can be a filter associated with one or more views and/or tables that provides access to one or more attributes of the one or more views and/or tables. In some embodiments, a data model definition specifies a one or more tables that includes a set of measures and a set of dimensions. In some such embodiments, a measure may be an attribute in the one or more tables that is configured to store a numeric value while a dimension may be an attribute in the one or more tables that is configured to store a value associated with a measure that is used for categorizing the measure.

FIG. 1 illustrates a system 100 for providing insights into visualizations of data according to some embodiments. As shown, system 100 includes client device 105, data processing system 125, and storages 145 and 150. Statistics storage 145 is configured to store statistics associated with data models while data models storage 150 is configured to store definitions of data models and data organized according to the data models. In some embodiments, storages 145 and 150 are implemented in a single physical storage while, in other embodiments, storages 145 and 150 may be implemented across several physical storages. While FIG. 1 shows storages 145 and 150 as external to data processing system 125, one of ordinary skill in the art will appreciated that storages 145 and/or 150 may be included in data processing system 125 in some embodiments.

As shown in FIG. 1, client device 105 includes visualization manager 110, dimension manager 115, and score engine 120. Visualization manager 110 is responsible for managing visualizations for client device 105. For instance, visualization manager 110 may receive requests from a user of client device 105 for visualizations of data stored according to a data model. In response to such a request, visualization manager 110 sends application 130 a request for the visualization. When visualization manager 110 receives the requested visualization from application 130, visualization manager 110 presents (e.g., by displaying on a display of client device 105) the visualization for viewing.

In addition, visualization manager 110 may handle input from a user of client device 105 through a visualization presented to the user. For example, visualization manager 110 can receive from a user, through a visualization of a measure of a data model categorized according to a dimension in the data model, a selection of a data insight option for a dimension value of the dimension. In response to the selection, visualization manager 110 sends dimension manager 115 a request for a set of dimensions of the data model that can provide insight into the measure of the data model filtered on the dimension value of the dimension selected by the user. When visualization manager 110 receives the set of dimensions, visualization manager 110 sends them to score engine 120 for scoring. In response, visualization manager 110 receives a subset of the set of dimensions from score engine 120, which visualization manager 110 presents (e.g., by displaying on a display of client device 105) to a user of client device 105 for selection.

In some instances, visualization manager 110 may receive from a user of client device 105 a selection of a dimension in a ranked set of dimensions that can provide insight into a measure of a data model filtered on a dimension value of a dimension in the data model selected by a user of client device 105 and a request for a visualization of the measure of the data model filtered on the dimension value of the dimension and categorized according to the dimension selected from the ranked set of dimensions. In response to such input from a user of client device 105, visualization manager 110 sends application 130 a request for such a visualization. Once visualization manager 110 receives the requested visualization from application 130, visualization manager 110 presents it to the user of client device 105.

Dimension manager 115 is configured to determine dimensions of a data model for providing insight into visualizations of data. For example, dimension manager 115 may receive from visualization manager 110 a request for a set of dimensions of a data model that can provide insight into a measure of the data model filtered on a dimension value of a dimension. In response to the request, dimension manager 115 forwards the request to statistics manager 135. In return, dimension manager 115 receives the set of dimensions from statistics manager 135 and then sends the set of dimensions to visualization manager 110.

Score engine 120 handles the scoring of dimensions. For instance, when score engine 120 receives from visualization manager 110 a set of dimensions of a data model that can provide insight into a measure of the data model filtered on a dimension value of a dimension, score engine 120 sends query processor 140 a request for metrics associated with each dimension in the set of dimensions. In some embodiments, the metrics associated with a dimension may include the average value of the measure categorized by dimension values of the dimension and the maximum value of the measure categorized by a dimension value of the dimension. Upon receiving the metrics from query processor 140, score engine 120 calculates a score for each dimension in the set of dimensions based on the metrics associated with the dimension. Then, score engine 120 ranks the set of dimensions based on the calculated scores and sends a defined number of the top-ranked dimensions to visualization manager 110.

As illustrated in FIG. 1, data processing system 125 includes application 130, statistics manager 135, and query processor 140. Application 130 may be a software application operating on (e.g., hosted on) data processing system 125 that may be accessed by client device 105. Application 130 may be any number of different types of applications. For instance, application 130 may be an analytics application, a data management application, a human capital management application, an enterprise management application, a customer relationship management application, a financial management application, etc.

Application 130 may receive requests from client device 105. For instance, application 130 can receive from client device 105 a request for a visualization of data stored according to a data model. In response to such a request, application 130 instructs query processor 140 to process the request. Once the request is processed, application 130 receives the requested visualization from query processor 140. Then, application 130 sends the visualization to client device 105.

Statistics manager 135 can handle requests for dimensions that can provide insights into data. For instance, statistics manager 135 may receive from client device 105 a request for a set of dimensions of a data model that can provide insight into a measure of the data model filtered on a dimension value of a dimension. Statistics manager 135 determines whether statistics associated with the data model exist in statistics storage 145 is. If such statistics do not exist in statistics storage 145, statistics manager 135 calculates statistics associated with the data model. In some embodiments, statistics that statistics manager 135 calculates for the data model include the cardinality of each dimension in the data model. Statistics manager 135 can calculate the cardinality of a dimension in a data model by determining the number of distinct values of the dimension based on the data stored in data models 150 according to the data model (e.g., a dataset of the data model). Other statistics that statistics manager 135 may calculate for the data model include the structural relationships between each different pair of dimensions in the data model. Statistics manager 135 may calculate the structural relationship between a pair of dimensions in a data model by determining whether the relationship between a first dimension in pair of dimensions and a second dimension in the pair of dimensions is a one-to-one relationship, a one-to-many relationship, or a many-to-many relationship. In some embodiments, statistics manager 135 determines that the relationship between the first dimension and the second dimension to be a one-to-one relationship when there is a one-to-one correspondence between a value of the first dimension and a value of the second dimension based on the data stored according to the data model. Statistics manager 135 may determine that the relationship between the first dimension and the second dimension to be a one-to-many relationship when there is a one-to-many correspondence between a value of the first dimension and a value of the second dimension based on the data stored according to the data model. Also, statistics manager 135 may determine that the relationship between the first dimension and the second dimension to be a many-to-many relationship when there is a many-to-many correspondence between a value of the first dimension and a value of the second dimension based on the data stored according to the data model.

When statistics associated with the data model do exist in statistics storage 145, statistics manager 135 determines the set of dimensions of the data model that can provide insight into the measure of the data model by accessing the statistics stored in statistics storage 145 and then accessing data models storage 150 to identifying all of the dimensions in the data model. Based on the statistics associated with the data model, statistics manager 135 excludes dimensions from the identified dimensions in the data model. In some embodiments, statistics manager 135 excludes dimensions in the data model that have a cardinality greater than a threshold value (e.g., forty, fifty, seventy-five, a hundred, etc.). As mentioned above, the request that statistics manager 135 may receive from client device 105 is for a set of dimensions of a data model that can provide insight into a measure of the data model filtered on a dimension value of a dimension. In some embodiments, statistics manager 135 excludes dimensions in the data model that have a one-to-many structural relationship with the dimension of the data model on which the measure is filtered based on the structural relationship included in the statistics associated with the data model.

Statistics manager 135 is also responsible for maintaining statistics associated with data models that are stored in statistics storage 145. For instance, when a data model is modified (e.g., dimensions and/or measures in the data model are added, removed, modified, etc.), statistics manager 135 recalculates the statistics associated with the date model (e.g., cardinalities of dimensions, structural relationships between pairs of dimensions, etc.). Statistics manager 135 can recalculate the statistics associated with the data model when data stored according to the data model is modified (e.g., a record of a dataset stored according to the data model is added, removed, modified, etc.). This way, the statistics associated with the data models are kept up-to-date. In some embodiments, statistics manager 135 checks for changes in data models and/or datasets stored according to data models and recalculates the statistics for data models that have been modified and/or have datasets stored according to data models that have been modified at defined intervals (e.g., once per hour, once per day, etc.).

Query processor 140 is responsible for handling requests from application 130. For example, query processor 140 may receive from application 130 a request for a visualization of data (e.g., a visualization of a measure of a data model categorized according to a dimension in the data model, a visualization of a measure of a data model filtered on a dimension value of a first dimension in the data model and categorized according to a second dimension in the data model, etc.). In response to such a request, query processor 140 then accesses the dataset stored according to the data model in data models storage 150, generates, based on the dataset, the requested visualization, and sends the generated visualization back to application 130.

In addition, query processor 140 handles requests from client device 105. For instance, query processor 140 can receive from client device 105 a request for metrics associated with a set of dimensions of a data model. As explained above, in some embodiments, the metrics associated with a dimension may include the average value of the measure categorized by dimension values of the dimension and the maximum value of the measure categorized by a dimension value of the dimension. In some such embodiments, query processor 140 determines such metrics by accessing the dataset stored according to the data model stored in data models storage 150 and calculating metrics for each dimension (e.g., the average value of a measure categorized by dimension values of the dimension, the maximum value of the measure categorized by a dimension value of the dimension, etc.) in the set of dimensions based on the dataset. Then, query processor 140 sends the metrics to client device 105.

The system illustrated in FIG. 1 shows a client device and a data processing system. One of ordinary skill in the art will appreciate that multiple client devices configured in a same or similar manner as client device 105 may be included in the system. As such, the client devices interact with the data processing system in the same or similar manner as that described above by reference to client device 105.

Figure 2:
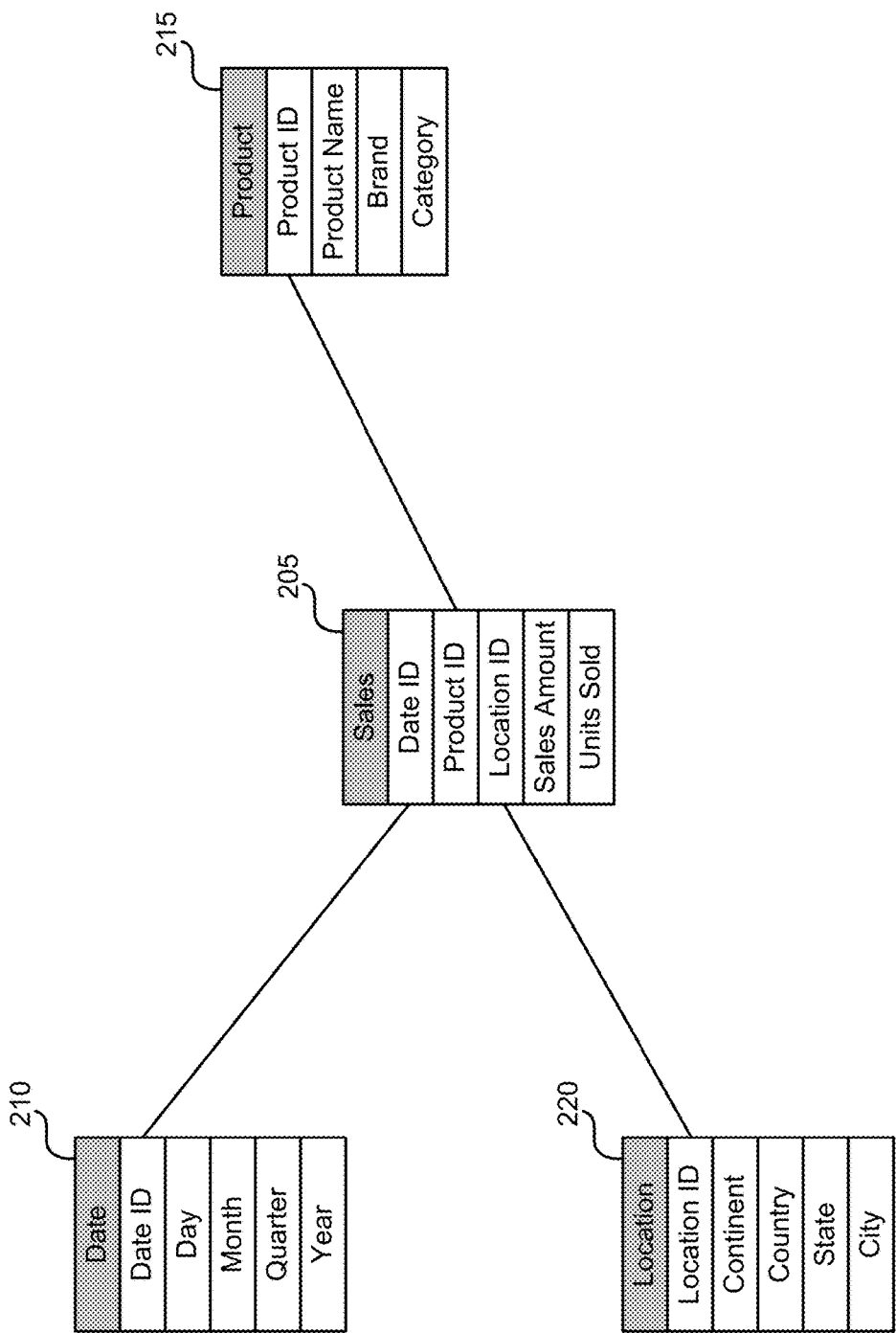
FIG. 2 illustrates an example data model according to some embodiments.

An example operation of system 100 will now be described by reference to FIGS. 2 and 3A-3D. FIG. 2 illustrates an example data model 200 according to some embodiments. For the purposes of simplicity and explanation, the views of data model 200 are not shown. As shown, data model 200 includes tables 205-220. In this example, data model 200 is implemented as a fact table and several dimension tables organized according to a snowflake schema (e.g., a star schema in this example). Specifically, table 205 is the fact table and tables 210-220 are the dimension tables. As illustrated, table 205 includes five attributes: date ID, product ID, location ID, sales amount, and units sold. For this example, the date ID, product ID, and location ID store unique identifiers (e.g., primary keys) used to reference records in table 210, table 215, and table 220, respectively. Attribute sales amount and units sold are measures. Table 210 includes five attributes: data ID, day, month, quarter, and year. Attribute data ID in table 210 stores a unique identifier (e.g., a foreign key) used to reference a record in table 205. Attributes day, month, quarter, and year are dimensions. That is, they may be used to categorize measures sales amount and units sold in table 205. Table 215 includes four attributes: product ID, product name, brand, and category. Attribute product ID in table 215 stores a unique identifier (e.g., a foreign key) used to reference a record in table 205. Attributes product name, brand, and category are dimensions. Thus, they may be used to categorize measures sales amount and units sold in table 205. Table 220 includes five attributes: location ID, continent, country, state, and city. Attribute location ID in table 220 stores a unique identifier (e.g., a foreign key) used to reference a records in table 205. Attributes continent, country, state, and city are dimensions. As such, they may be used to categorize measures sales amount and units sold in table 205.

Figure 3A:
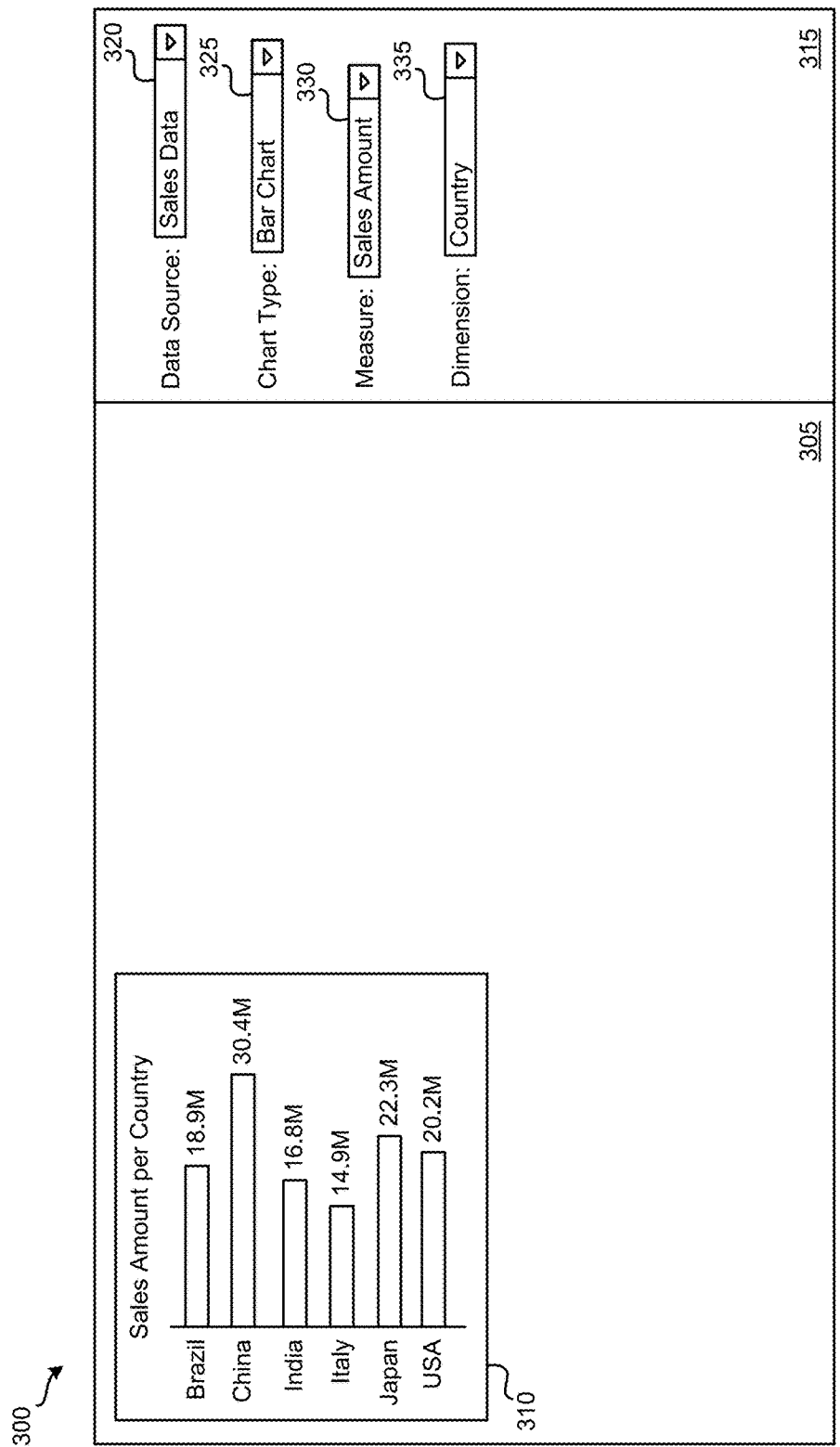
FIGS. 3A-3D illustrate an example graphical user interface for providing chart visualizations according to some embodiments.

FIGS. 3A-3D illustrate an example graphical user interface (GUI) 300 for providing chart visualizations according to some embodiments. As illustrated in FIG. 3A, GUI 300 includes display area 305 and display area 315. For this example, display area 305 is configured to provide visualizations of data. In FIG. 3A, display area 315 is providing selectable user interface (UI) items 320-335 (e.g., drop-down menu controls). UI item 320 is for selecting a data source (e.g., a dataset stored according to a data model), UI item 325 is for selecting a chart type, UI item 330 is for selecting a measure in the data source (e.g., a measure in a data model according to which data in the data source is stored), and UI item 335 is for selecting a dimension in the data source (e.g., a dimension in a data model according to which data in the data source is stored).

The example operation of system 100 begins with visualization manager 110 receiving from a user of client device 105 a request for a visualization of data. In this example, the user is requesting a visualization of data from sales data, a dataset stored according to data model 200. In particular, the request is for a visualization of the measure sales amount of data model 200 that is categorized according to the country dimension of data model 200. The user is requesting the visualization using UI items 320-335 to specify the data source, chart type, measure, and dimension for the visualization. When visualization manager 110 receives the request, visualization manager forwards the request to application 130. When visualization manager 110 receives the requested visualization from application 130, visualization manager 110 presents (e.g., by displaying on a display of client device 105) the visualization for viewing. FIG. 3A illustrates GUI 300 after visualization manager 110 presents the visualization for viewing. As shown, visualization manager provides visualization 310 in display area 305 for viewing. Visualization 310 depicts a bar chart visualization of the total value of a measure of data model 200 (the measure sales amount in this example) for each dimension value of a dimension of data model 200 (the dimension values Brazil, China, India, Italy, Japan, and USA of the country dimension in this example).

Figure 3B:
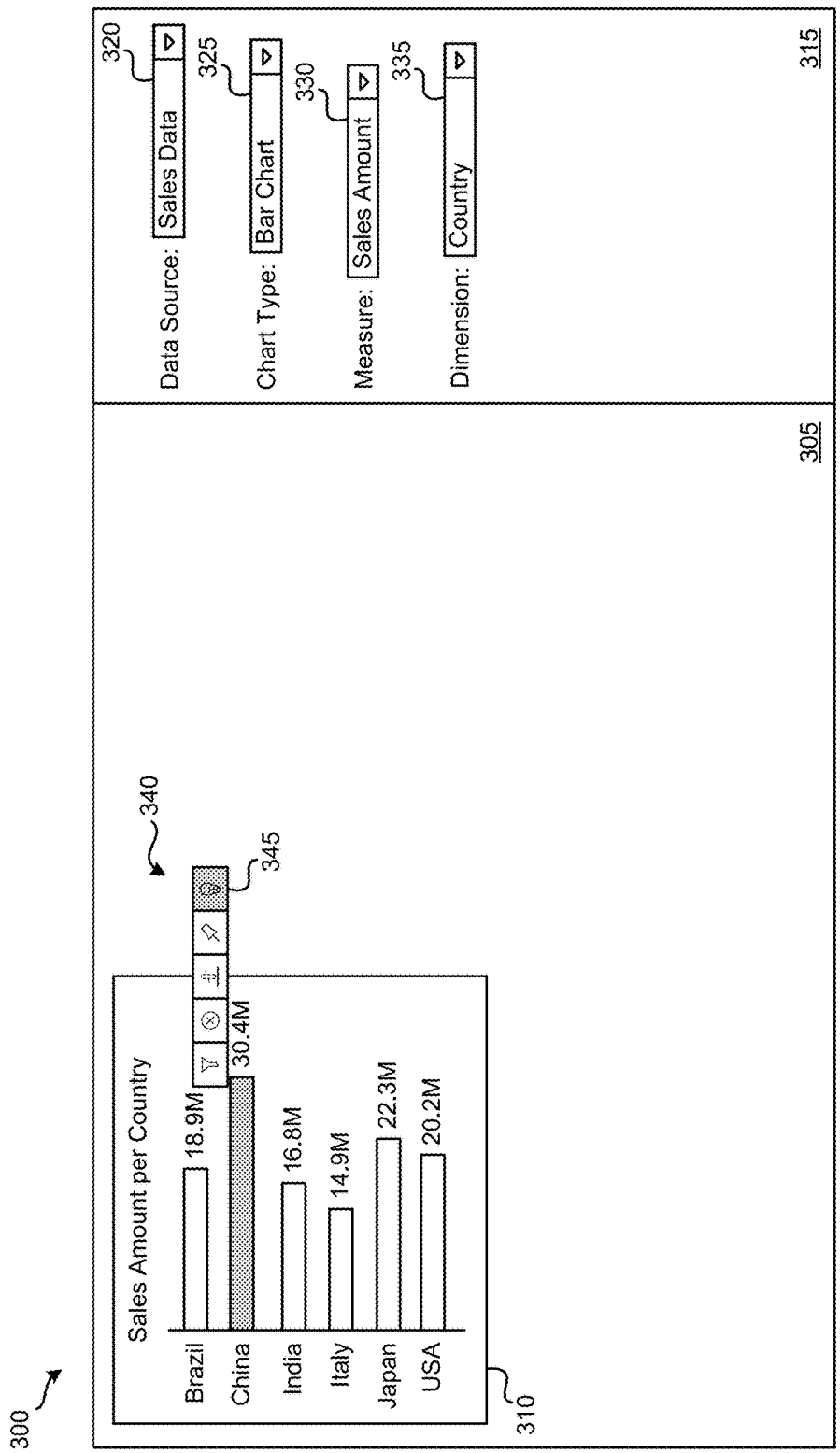

Next, the user of client device 105 selects the China dimension value in visualization 310 and then requests data insights into the China dimension value of the country dimension. FIG. 3B illustrates GUI 300 after the user has made such selections. As shown in FIG. 3B, GUI 300 includes option menu 340 that includes selectable UI item 345, which is for requesting insights into the sales amount for China. The user may provide a command (e.g., a right-click mouse input, a selection of an option in a drop-down menu, a sequential and/or simultaneous combination of keyboard inputs, hovering a pointer near or over the bar representing the representing the sales amount for China in visualization 310, etc.) through GUI 300 to invoke option menu 340. In this example, the user selects the China dimension value by selecting the bar representing the sales amount for China, as indicated by a highlight of the bar representing the sales amount for China in visualization 310. The user requests data insights into the China dimension value of the country dimension by selecting UI item 345, as indicated by a highlight of UI item 345.

When visualization manager 110 receives the selection of the China dimension value and the request for data insights into the China dimension value of the country dimension, visualization manager 110 sends dimension manager 115 a request for a set of dimensions of data model 200 that can provide insight into the sales amount measure filtered on the China dimension value of the country dimension. When dimension manager 115 receives the request from visualization manager 110, dimension manager 115 sends the request to statistics manager 135.

In response to the request, statistics manager 135 determines whether statistics associated with data model 200 exist in statistics storage 145. If such statistics do not exist in statistics storage 145, statistics manager 135 calculates statistics associated with data model 200. As described above, statistics associated with a data model may include the cardinality of each dimension in the data model and the structural relationships between each different pair of dimensions in the data model. Statistics manager 135 can calculate the cardinality of a dimension in data model 200 by determining the number of distinct values of the dimension based on the data stored in data models storage 150 according to data model 200. For instance, the cardinality of the country dimension in this example, as illustrated in visualization 310, is six because there are six distinct values (i.e., Brazil, China, India, Italy, Japan, and USA) for the country dimension. Statistics manager 135 may calculate the structural relationship between a pair of dimensions in data model 200 by determining whether the relationship between a first dimension in pair of dimensions and a second dimension in the pair of dimensions is a one-to-one relationship, a one-to-many relationship, or a many-to-many relationship. For instance, the structural relationship between the continent dimension and the country dimension in data model 200 may be determined to be a one-to-many relationship since each country belongs to only one continent while a continent can have many countries. In other words, all of the records of data stored according to data model 200 that have a particular value for the continent dimension can have different values for the country dimension while all of the records of data stored according to data model 200 that have a particular value for a country dimension have the same value for the continent dimension. As another example, the structural relationship between the product dimension and the country dimension in data model 200 may be determined to be a one-to-many relationship if only one product is sold in each country and the products sold in each country are all different. That is, all of the records of data stored according to data model 200 that have a particular value for the product dimension have the same corresponding value for the country dimension.

In some embodiments, when statistics associated with data model 200 do not exist in statistics storage 145, statistics manager 135 calculates the cardinalities of the dimensions in data model 200 and determines the set of dimensions based on the cardinalities. To determine the set of dimensions in such instances, statistics manager 135 excludes dimensions in data model 200 that have a cardinality greater than a threshold value (e.g., forty, fifty, seventy-five, a hundred, etc.). In this example, dimensions product name, state, city, and country have cardinalities greater than the threshold value. Thus, statistics manager 135 excludes them. Thus, the resulting set of dimensions include dimensions brand, month, category, day, year, and continent, which statistics manager 135 sends to dimension manager 115. Next, statistics manager 135 calculates the structural relationships between pairs of dimensions in data model 200 at a defined time after determining the set of dimensions.

When statistics associated with data model 200 do exist in statistics storage 145 and structural relationships between pairs of dimensions in data model 200 have been calculated, statistics manager 135 determines the set of dimensions based on the cardinalities and the structural relationships. To determine the set of dimensions in such instances, statistics manager 135 excludes dimensions in data model 200 that have a cardinality greater than a threshold value (e.g., forty, fifty, seventy-five, a hundred, etc.). For this example, dimensions product name, state, city, and country have cardinalities greater than the threshold value. Thus, statistics manager 135 excludes them. As such, the remaining dimensions include dimensions brand, month, category, day, year, and continent. Next, statistics manager 135, statistics manager 135 excludes dimensions in data model 200 based on the structural relationships between pairs of dimension in data model 200. In some embodiments, statistics manager 135 excludes dimensions in data model 200 that have a one-to-many structural relationship with the country dimension of data model 200. In this example, the continent dimension has a one-to-many relationship with the country dimension. Hence, statistics manager 135 excludes the continent dimension. The resulting set of dimensions include dimensions brand, month, category, day, and year, which statistics manager 135 sends to dimension manager 115. Once dimension manager 115 receives the set of dimensions from statistics manager 135, dimension manager 115 sends the set of dimensions to visualization manager 110. Upon receiving the set of dimensions, visualization manager 110 sends them to score engine 120 for scoring.

When score engine 120 receives the set of dimensions, score engine 120 sends query processor 140 a request for metrics associated with each dimension in the set of dimensions. As described above, in some embodiments, the metrics associated with a dimension may include the average value of the measure categorized by dimension values of the dimension and the maximum value of the measure categorized by a dimension value of the dimension. Upon receiving the metrics from query processor 140, score engine 120 calculates a score for each dimension in the set of dimensions based on the metrics associated with the dimension. In some embodiments, score engine uses the following equation to calculate a score for a dimension:

$$S_d = \frac{M_{max} - M_{avg}}{M_{avg}}$$

where $S_d$ is the score of dimension d, $M_{max}$ is the maximum value of measure M categorized by a dimension value of dimension d, and $M_{avg}$ is the average value of measure M categorized by dimension values of dimension d. A scores calculated using the above equation represents the deviation between the maximum value and the average value. Once score engine 120 calculates a score for each dimension in the set of dimensions, score engine 120 ranks the set of dimensions based on the calculated scores and sends a defined number of the top-ranked dimensions to visualization manager 110. In this example, the defined number of the top-ranked dimensions to send to visualization manager 110 is three. For this example, the three top-ranked dimensions are the dimensions brand, month, and category. An example of an equation for calculating a score of a dimension is provided above. One of ordinary skill in the art will understand that different equations for calculating a scoring for a dimension may be used in different embodiments.

Figure 3C:
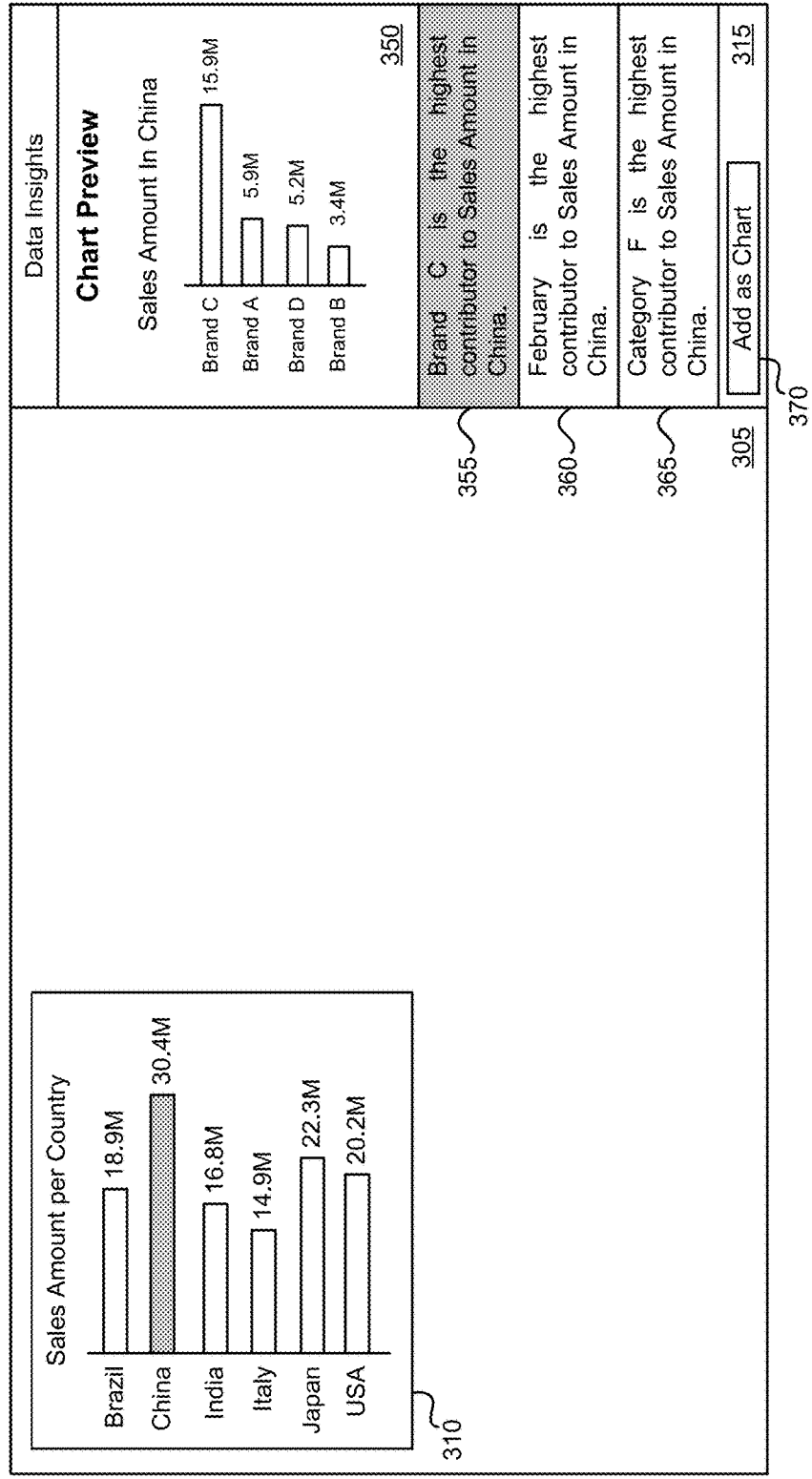

Once visualization manager 110 receives a set of dimensions from score engine 120, visualization manager 110 presents them to a user of client device 105 for selection. FIG. 3C illustrates GUI 300 after visualization manager 110 presents the three top-ranked dimensions of data model 200. As shown in FIG. 3C, GUI 300 includes three selectable UI items 355-365 that represent the three top-ranked dimensions brand, month, and category, respectively. Upon presenting UI items 355-365, visualization manager 110 selects the top-ranked dimension and provides a preview of a visualization of the sales amount measure filtered on the China dimension value of the country dimension of data model 200 and categorized according to the top-ranked dimension. As illustrated in FIG. 3C, visualization manager 110 has selected UI item 355, which corresponds to brand, the top-ranked dimension, as indicated by a highlighting of UI item 355 and has presented preview visualization 350 of the sales amount measure filtered on the China dimension value of the country dimension and categorized according to the brand dimension. When visualization manager 110 receives a selection of UI item 360 or UI item 365, visualization manager 110 highlights the selected UI item and provides a preview visualization of the dimension associated with the selected UI item.

GUI 300 of FIG. 3C also includes selectable UI item 370. Selectable UI item 370 is configured for adding a visualization of the sales amount measure filtered on the China dimension value of the country dimension of data model 200 and categorized according to the dimension associated with the selected UI item 355, 360, or 365. For this example, the user of client device 105 selects UI item 370 to add a visualization of the sales amount measure filtered on the China dimension value of the country dimension and categorized according to the brand dimension to display area 305. When visualization manager 110 receives the selection from the user, visualization manager 110 sends application 130 a request for the visualization, which application 130 forwards to query processor 140. In response, query processor 140 accesses the sales data dataset stored according to data model 200 in data models storage 150, generates, based on the sales data dataset, the requested visualization, and sends the generated visualization back to application 130. Application 130 sends the visualization to client device 105 and visualization manager 110 presents to the user of client device 105.

Figure 3D:
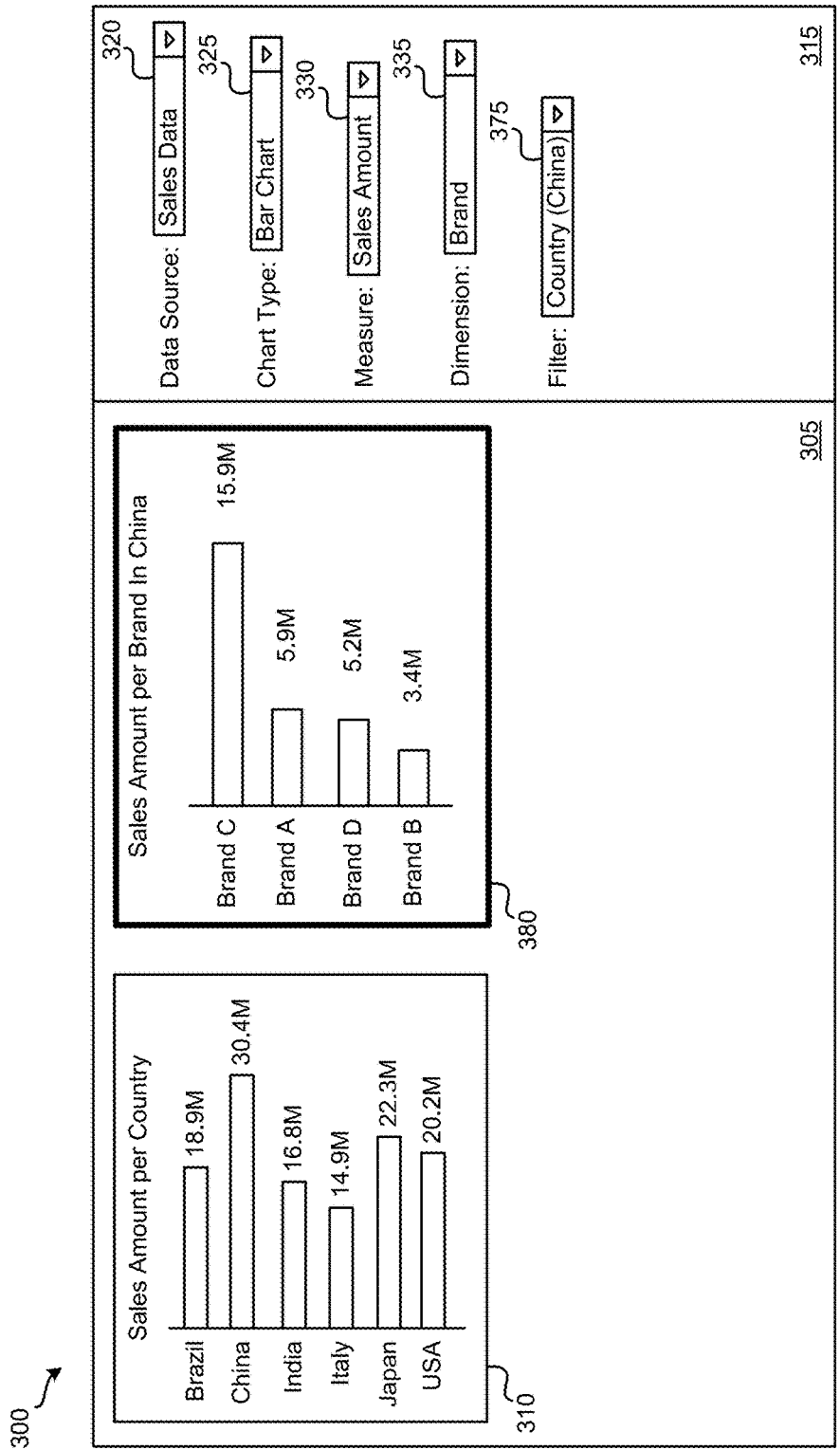

FIG. 3D illustrates GUI 300 after visualization manager 110 presents such a visualization in display area 305. As shown, GUI 300 includes visualization 380, which is a visualization of the sales amount measure filtered on the China dimension value of the country dimension and categorized according to the brand dimension. FIG. 3D also illustrates that display area 315 provides UI items 320-335. The UI items 320-335 indicate the attributes associated with visualization 380. As shown, UI item 320 specifies sales data, a dataset stored according to data model 200, as a data source. UI item 325 specifies a bar chart as the chart type, UI item 330 specifies sales amount as a measure, and UI item 335 specifies brand as a dimension. In addition, visualization manager 110 presents selectable UI item 375 in display area 315. UI item 375 is for selecting a dimension value of the country dimension on which to measure is filtered. In this example, the China dimension value of the country dimension is the dimension value on which the sales amount measure is filtered.

Figure 4:
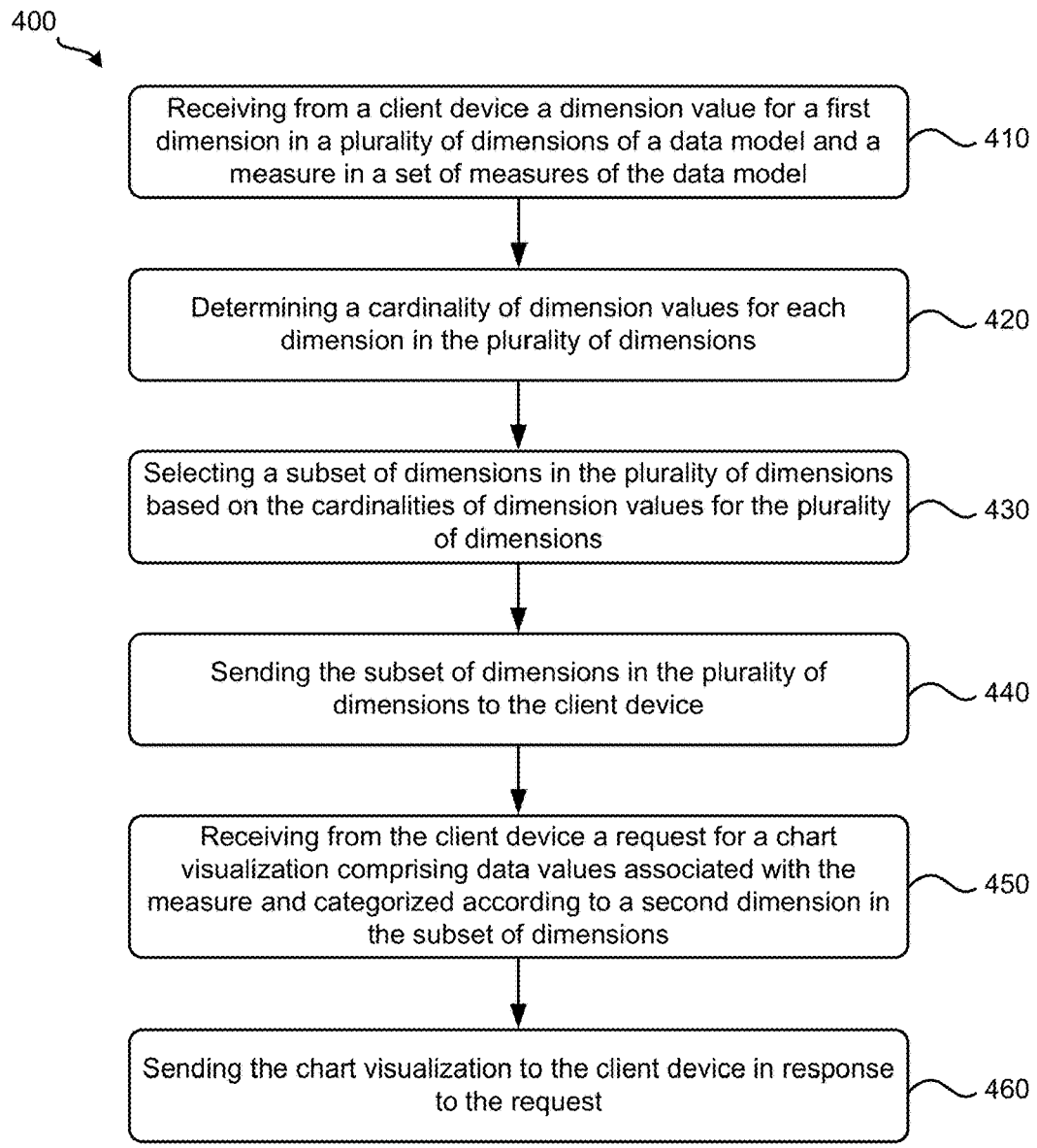
FIG. 4 illustrates a process for providing insights into visualizations of data according to some embodiments.

FIG. 4 illustrates process 400 for providing insights into visualizations of data according to some embodiments. In some embodiments, data processing system 125 performs process 400. Process 400 starts by receiving, at 410, from a client computing device, a dimension value for a first dimension in a plurality of dimensions of a data model and a measure in a set of measures of the data model. Referring to FIGS. 1, 2, and 3B as an example, the user of client device 105 selects the China dimension value of the country dimension by selecting the bar representing the sales amount for China, as indicated by a highlight of the bar representing the sales amount for China in visualization 310, and then the user requests data insights into the China dimension value of the country dimension by selecting UI item 345, as indicated by a highlight of UI item 345. When visualization manager 110 receives the selection and request, visualization manager 110 sends dimension manager 115 a request for a set of dimensions of data model 200 that can provide insight into the sales amount measure filtered on the China dimension value of the country dimension. Dimension manager 115 sends statistics manager 135 the China dimension value of the country dimension and the sales amount measure along with the request.

Next, process 400 determines, at 410, a cardinality of dimension values for each dimension in the plurality of dimensions. Referring to FIGS. 1 and 2 as an example, statistics manager 135 may determine cardinalities of dimension values for dimensions day, month, quarter, year, product name, brand, category, continent, country, state, and city in data model 200. Process 400 then selects, at 430, a subset of dimensions in the plurality of dimensions based on the cardinalities of dimension values for the plurality of dimensions. In some embodiments, process 400 determines the subset of dimensions by excluding dimensions in the data model that have a cardinality greater than a threshold value. After dimensions have been excluded based on cardinality of dimension value, the remaining dimensions are selected as the subset of dimensions.

After selecting the subset of dimensions, process 400 sends, at 440, the subset of dimensions in the plurality of dimensions to the client device. Referring to FIG. 1 as an example, dimension manager 115 may receive the subset of dimensions from statistics manager 135. Dimension manager 115 sends the subset of dimensions to visualization manager 110, which visualization manager 110 sends to score engine 120 for scoring. Once visualization manager 110 receives the subset of dimensions from score engine 120, visualization manager 110 presents them to the user of client device 105 for selection.

Next, process 400 receives, at 450, from the client device, a request for a chart visualization comprising data values associated with the measure and categorized according to a second dimension in the subset of dimensions. Referring to FIGS. 1, 2, and 3C as an example, upon receiving a selection of UI item 370 in GUI 300, client device 105 may send application 130 a request for a chart visualization of the sales amount measure of data model 200 filtered on the China dimension value of the country dimension in data model 200 and categorized according to the brand dimension in data model 200. Application 130 instructs query processor 140 to process the request. Once query processor 140 generates the requested visualization, query processor 140 sends the visualization to application 130. Finally, process 400 sends, at 460, the chart visualization to the client device in response to the request. Referring to FIGS. 1 and 3D as an example, application 130 may send visualization 380 to client device 105. Client device 105 presents visualization 380 in display area 305 of GUI 300.

Figure 5:
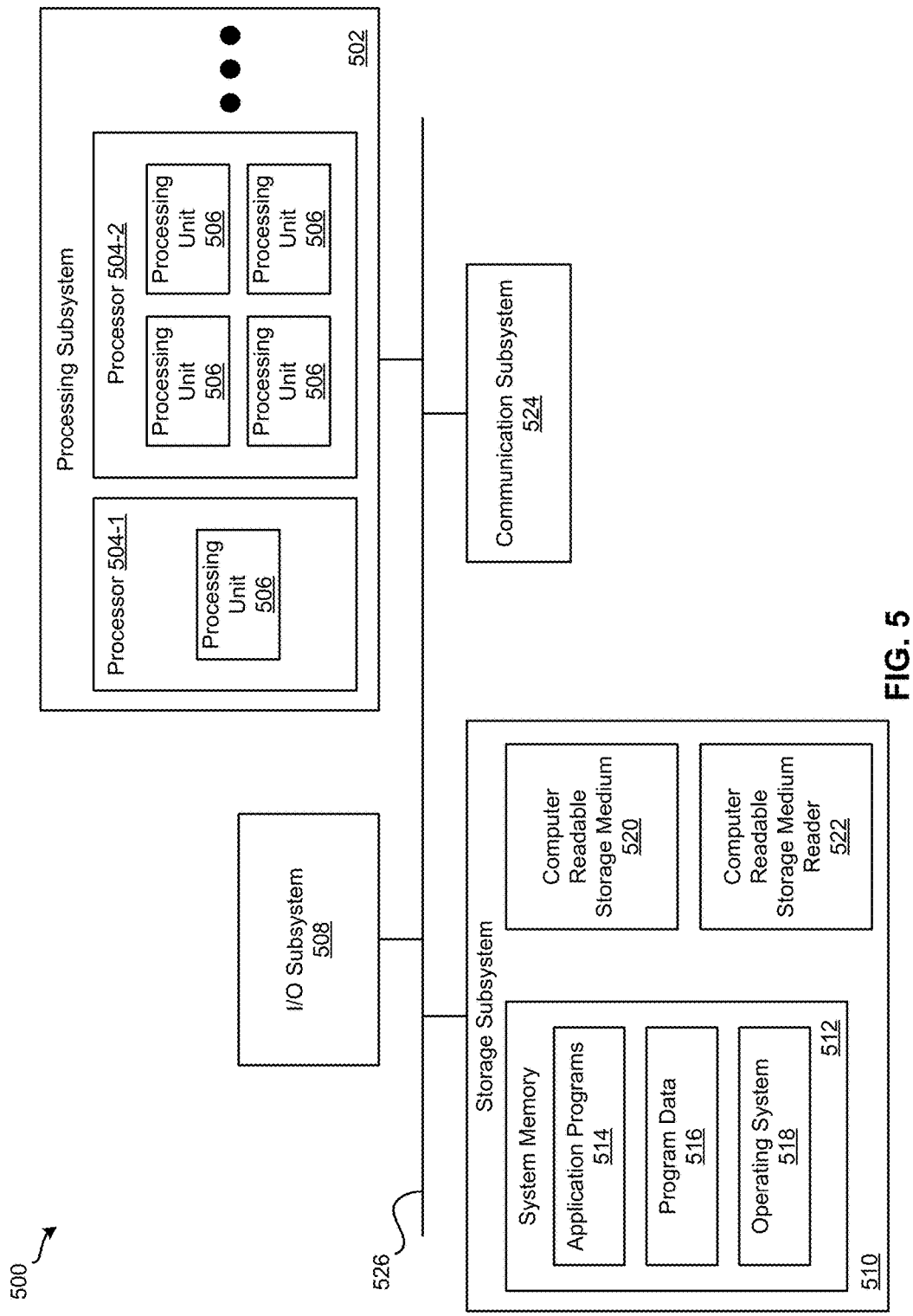
FIG. 5 illustrates an exemplary computer system, in which various embodiments may be implemented.

FIG. 5 illustrates an exemplary computer system 500 for implementing various embodiments described above. For example, computer system 500 may be used to implement client device 105 and data processing system 125. Computer system 500 may be a desktop computer, a laptop, a server computer, or any other type of computer system or combination thereof. Some or all elements of visualization manager 110, dimension manager 115, score engine 120, application 130, statistics manager 135, query processor 140, or combinations thereof can be included or implemented in computer system 500. In addition, computer system 500 can implement many of the operations, methods, and/or processes described above (e.g., process 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 400, etc.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514 (e.g., application 130), program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., visualization manager 110, dimension manager 115, score engine 120, application 130, statistics manager 135, and query processor 140) and/or processes (e.g., process 400) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
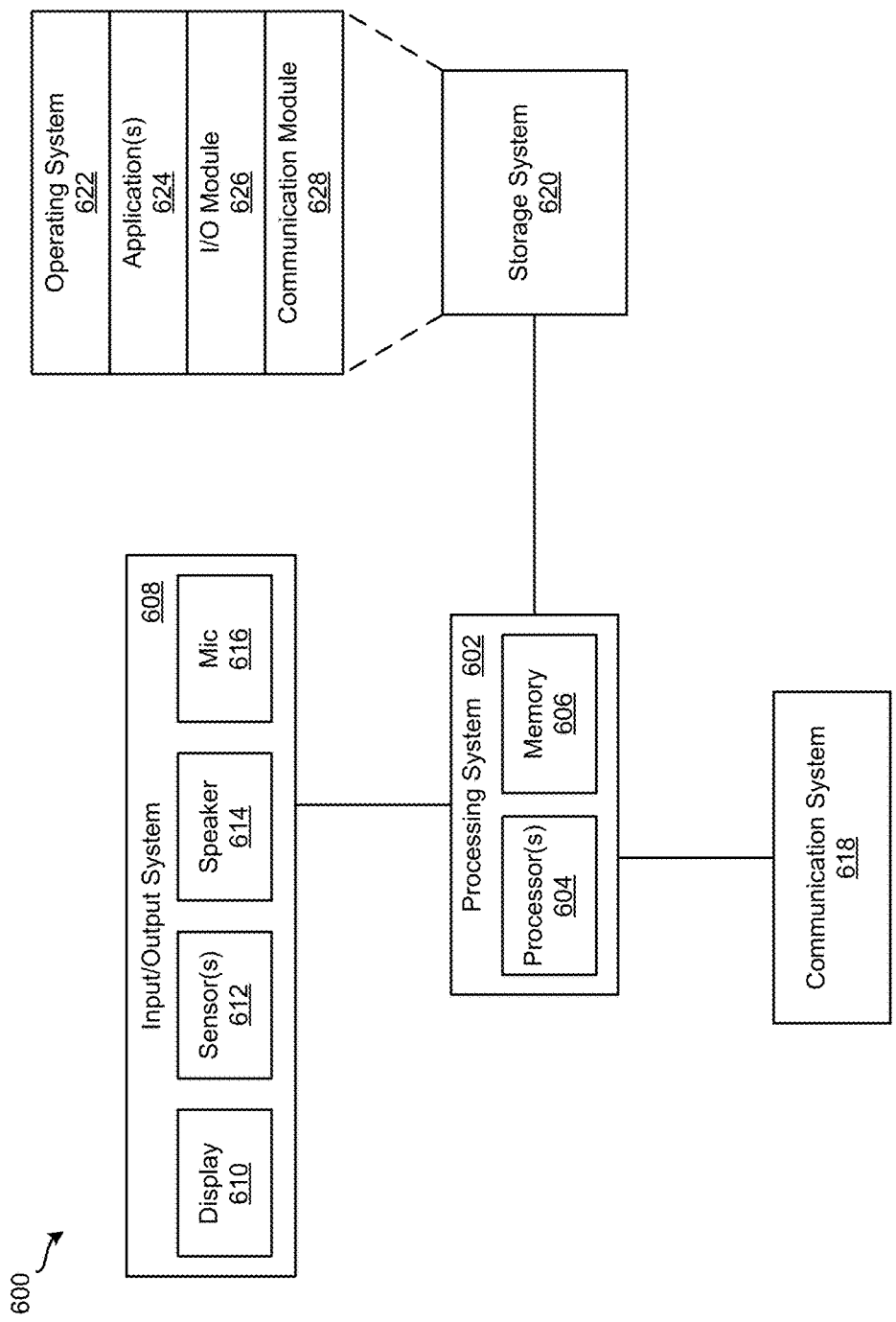
FIG. 6 illustrates an exemplary computing device, in which various embodiments may be implemented.

FIG. 6 illustrates an exemplary computing device 600 for implementing various embodiments described above. For example, computing device 600 may be used to implement client device 105. Computing device 600 may be a cellphone, a smartphone, a wearable device, an activity tracker or manager, a tablet, a personal digital assistant (PDA), a media player, or any other type of mobile computing device or combination thereof. Some or all elements of visualization manager 110, dimension manager 115, score engine 120, or combinations thereof can be included or implemented in computing device 600. As shown in FIG. 6, computing device 600 includes processing system 602, input/output (I/O) system 608, communication system 618, and storage system 620. These components may be coupled by one or more communication buses or signal lines.

Processing system 602, which can be implemented as one or more integrated circuits (e.g., a conventional microprocessor or microcontroller), controls the operation of computing device 600. As shown, processing system 602 includes one or more processors 604 and memory 606. Processors 604 are configured to run or execute various software and/or sets of instructions stored in memory 606 to perform various functions for computing device 600 and to process data.

Each processor of processors 604 may include one processing unit (e.g., a single core processor) or several processing units (e.g., a multicore processor). In some embodiments, processors 604 of processing system 602 may be implemented as independent processors while, in other embodiments, processors 604 of processing system 602 may be implemented as multiple processors integrate into a single chip. Still, in some embodiments, processors 604 of processing system 602 may be implemented as a combination of independent processors and multiple processors integrated into a single chip.

Memory 606 may be configured to receive and store software (e.g., operating system 622, applications 624, I/O module 626, communication module 628, etc. from storage system 620) in the form of program instructions that are loadable and executable by processors 604 as well as data generated during the execution of program instructions. In some embodiments, memory 606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 608 is responsible for receiving input through various components and providing output through various components. As shown for this example, I/O system 608 includes display 610, one or more sensors 612, speaker 614, and microphone 616. Display 610 is configured to output visual information (e.g., a graphical user interface (GUI) generated and/or rendered by processors 604). In some embodiments, display 610 is a touch screen that is configured to also receive touch-based input. Display 610 may be implemented using liquid crystal display (LCD) technology, light-emitting diode (LED) technology, organic LED (OLED) technology, organic electro luminescence (OEL) technology, or any other type of display technologies. Sensors 612 may include any number of different types of sensors for measuring a physical quantity (e.g., temperature, force, pressure, acceleration, orientation, light, radiation, etc.). Speaker 614 is configured to output audio information and microphone 616 is configured to receive audio input. One of ordinary skill in the art will appreciate that I/O system 608 may include any number of additional, fewer, and/or different components. For instance, I/O system 608 may include a keypad or keyboard for receiving input, a port for transmitting data, receiving data and/or power, and/or communicating with another device or component, an image capture component for capturing photos and/or videos, etc.

Communication system 618 serves as an interface for receiving data from, and transmitting data to, other devices, computer systems, and networks. For example, communication system 618 may allow computing device 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 618 may provide components configured for wired communication (e.g., Ethernet) in addition to or instead of components configured for wireless communication.

Storage system 620 handles the storage and management of data for computing device 600. Storage system 620 may be implemented by one or more non-transitory machine-readable mediums that are configured to store software (e.g., programs, code modules, data constructs, instructions, etc.) and store data used for, or generated during, the execution of the software. Many of the components (e.g., visualization manager 110, dimension manager 115, and score engine 120) described above may be implemented as software that when executed by a processor or processing unit (e.g., processors 604 of processing system 602) performs the operations of such components and/or processes.

In this example, storage system 620 includes operating system 622, one or more applications 624, I/O module 626, and communication module 628. Operating system 622 includes various procedures, sets of instructions, software components and/or drivers for controlling and managing general system tasks (e.g., memory management, storage device control, power management, etc.) and facilitates communication between various hardware and software components. Operating system 622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 624 can include any number of different applications installed on computing device 600. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 626 manages information received via input components (e.g., display 610, sensors 612, and microphone 616) and information to be outputted via output components (e.g., display 610 and speaker 614). Communication module 628 facilitates communication with other devices via communication system 618 and includes various software components for handling data received from communication system 618.

One of ordinary skill in the art will realize that the architecture shown in FIG. 6 is only an example architecture of computing device 600, and that computing device 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
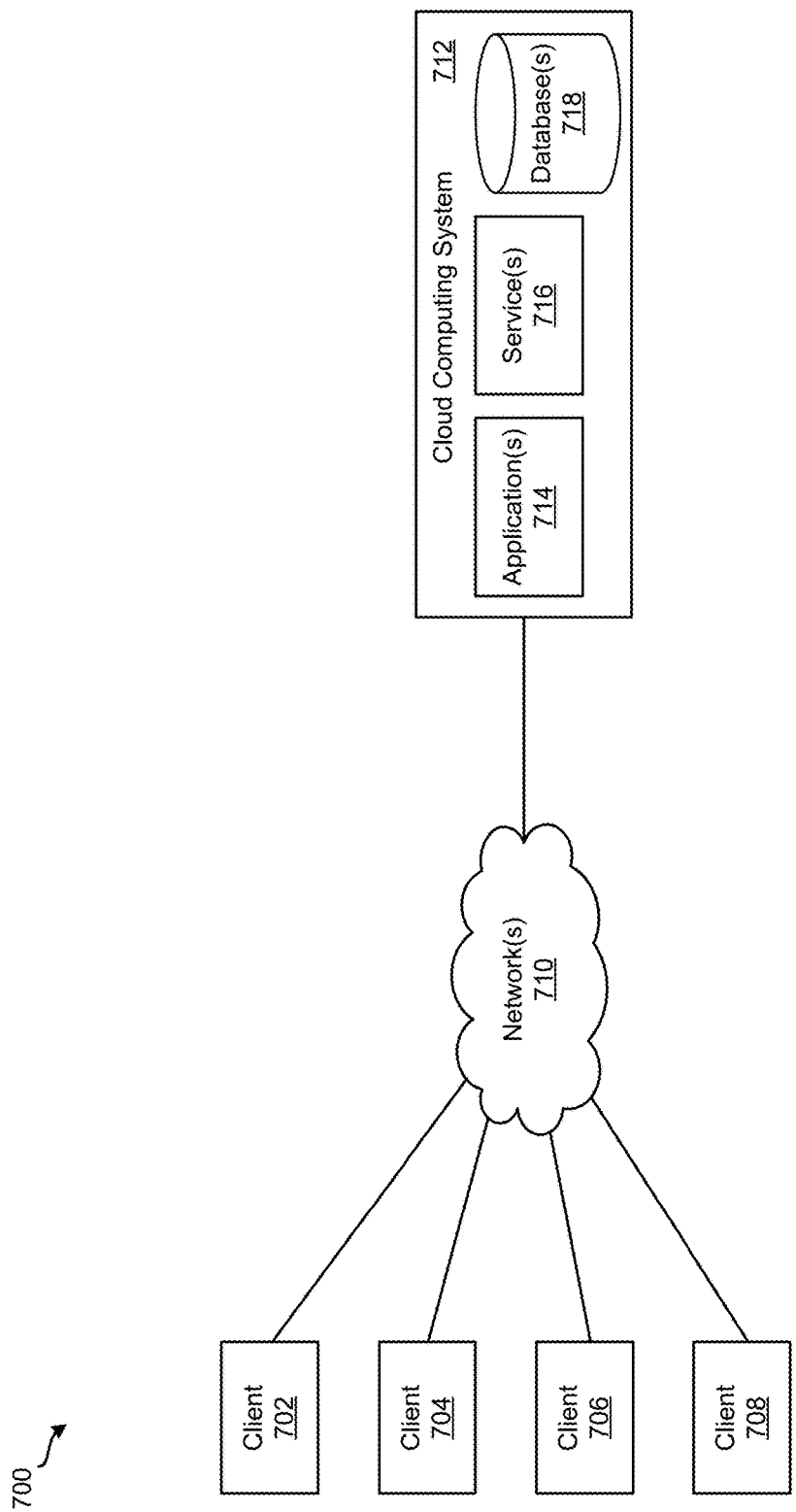
FIG. 7 illustrates system for implementing various embodiments described above.

FIG. 7 illustrates an exemplary system 700 for implementing various embodiments described above. For example, cloud computing system 712 of system 700 may be used to implement data processing system 125 and a client device 702-708 may be used to implement client device 105. As shown, system 700 includes client devices 702-708, one or more networks 710, and cloud computing system 712. Cloud computing system 712 is configured to provide resources and data to client devices 702-708 via networks 710. In some embodiments, cloud computing system 700 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 700 may provide applications 714, services 716, and databases 718 to any number of different customers in a self-service, subscription-based, elastically scalable, reliable, highly available, and secure manner.

In some embodiments, cloud computing system 700 may be adapted to automatically provision, manage, and track a customer's subscriptions to services offered by cloud computing system 700. Cloud computing system 700 may provide cloud services via different deployment models. For example, cloud services may be provided under a public cloud model in which cloud computing system 700 is owned by an organization selling cloud services and the cloud services are made available to the general public or different industry enterprises. As another example, cloud services may be provided under a private cloud model in which cloud computing system 700 is operated solely for a single organization and may provide cloud services for one or more entities within the organization. The cloud services may also be provided under a community cloud model in which cloud computing system 700 and the cloud services provided by cloud computing system 700 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 700 is referred to as a "cloud service." Typically, servers and systems that make up cloud computing system 700 are different from the on-premises servers and systems of a customer. For example, cloud computing system 700 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transport protocol) server applications, FTP (file transfer protocol) server applications, CGI (common gateway interface) server applications, JAVA server applications, etc.). Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. For instance, storages 145 and 150 may be stored in databases 718. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 700. Client devices 702-708 may be computer system 500 or computing device 600, as described above by reference to FIGS. 5 and 6, respectively. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:
    receiving from a client device a selection of a dimension value for a first dimension in a plurality of dimensions of a data model and a measure in a set of measures of the data model;
    determining a cardinality of dimension values for each dimension in the plurality of dimensions;
    determining a subset of dimensions in the plurality of dimensions based on the cardinalities of dimension values for the plurality of dimensions;
    providing the subset of dimensions in the plurality of dimensions to the client device for selection;
    receiving from the client device a selection of a second dimension in the subset of dimensions in the plurality of dimensions; and
    in response to receiving the selection of the second dimension, sending a chart visualization to the client device for display on the client device, the chart visualization comprising data values associated with the measure, filtered based on the dimension value for the first dimension, and categorized according to the selected second dimension in the subset of dimensions.

2. The non-transitory machine-readable medium of claim 1, wherein the chart visualization is a first chart visualization, wherein the program further comprises a set of instructions for providing a second chart visualization comprising a set of data values associated with the measure and categorized according to the first dimension.

3. The non-transitory machine-readable medium of claim 2, wherein the selection of the dimension value for the first dimension is received through the second chart visualization.

4. The non-transitory machine-readable medium of claim 1, wherein the program further comprises a set of instructions for determining structural relationships between pairs of dimensions in the plurality of dimensions, wherein determining the subset of dimensions in the plurality of dimensions is further based on the structural relationships.

5. The non-transitory machine-readable medium of claim 1, wherein the program further comprises a set of instructions for generating the chart visualization in response to receiving the selection of the second dimension.

6. The non-transitory machine-readable medium of claim 5, wherein generating the chart visualization comprises filtering the data values associated with the measure based on the dimension value for the first dimension.

7. The non-transitory machine-readable medium of claim 6, wherein generating the chart visualization further comprises categorizing the filtered data values associated with the measure based on the second dimension.

8. A method, executable by a computing device, comprising:
    receiving from a client device a selection of a dimension value for a first dimension in a plurality of dimensions of a data model and a measure in a set of measures of the data model;
    determining a cardinality of dimension values for each dimension in the plurality of dimensions;
    determining a subset of dimensions in the plurality of dimensions based on the cardinalities of dimension values for the plurality of dimensions;
    providing the subset of dimensions in the plurality of dimensions to the client device for selection;
    receiving from the client device a selection of a second dimension in the subset of dimensions in the plurality of dimensions; and
    in response to receiving the selection of the second dimension, sending a chart visualization to the client device for display on the client device, the chart visualization comprising data values associated with the measure, filtered based on the dimension value for the first dimension, and categorized according to the selected second dimension in the subset of dimensions.

9. The method of claim 8, wherein the chart visualization is a first chart visualization, wherein the method further comprises providing a second chart visualization comprising a set of data values associated with the measure and categorized according to the first dimension.

10. The method of claim 9, wherein the selection of the dimension value for the first dimension is received through the second chart visualization.

11. The method of claim 8 further comprising determining structural relationships between pairs of dimensions in the plurality of dimensions, wherein determining the subset of dimensions in the plurality of dimensions is further based on the structural relationships.

12. The method of claim 8 further comprising generating the chart visualization in response to receiving the selection of the second dimension.

13. The method of claim 12, wherein generating the chart visualization comprises filtering the data values associated with the measure based on the dimension value for the first dimension.

14. The method of claim 13, wherein generating the chart visualization further comprises categorizing the filtered data values associated with the measure based on the second dimension.

15. A system comprising:
a set of processing units; and
a non-transitory computer-readable medium storing instructions that when executed by at least one processing unit in the set of processing units cause the at least one processing unit to:
receive from a client device a selection of a dimension value for a first dimension in a plurality of dimensions of a data model and a measure in a set of measures of the data model;
determine a cardinality of dimension values for each dimension in the plurality of dimensions;
determine a subset of dimensions in the plurality of dimensions based on the cardinalities of dimension values for the plurality of dimensions;
provide the subset of dimensions in the plurality of dimensions to the client device for selection;
receive from the client device a selection of a second dimension in the subset of dimensions in the plurality of dimensions; and
in response to receiving the selection of the second dimension, send a chart visualization to the client device for display on the client device, the chart visualization comprising data values associated with the measure, filtered based on the dimension value for the first dimension, and categorized according to the selected second dimension in the subset of dimensions.

16. The system of claim 15, wherein the chart visualization is a first chart visualization, wherein the instructions further cause the at least one processing unit to provide a second chart visualization comprising a set of data values associated with the measure and categorized according to the first dimension.

17. The system of claim 16, wherein the selection of the dimension value for the first dimension is received through the second chart visualization.

18. The system of claim 15, wherein the instructions further cause the at least one processing unit to determine structural relationships between pairs of dimensions in the plurality of dimensions, wherein determining the subset of dimensions in the plurality of dimensions is further based on the structural relationships.

19. The system of claim 15, wherein the instructions further cause the at least one processing unit to generate the chart visualization in response to receiving the selection of the second dimension.

20. The system of claim 19, wherein generating the chart visualization comprises filtering the data values associated with the measure based on the dimension value for the first dimension.

* * * * *